(12) United States Patent
Odendall et al.

(10) Patent No.: US 8,225,649 B2
(45) Date of Patent: Jul. 24, 2012

(54) METHOD FOR DETERMINING THE OXYGEN STORAGE CAPACITY

(75) Inventors: Bodo Odendall, Lenting (DE); Martin Schneider, Pietenfeld (DE)

(73) Assignee: Audi AG, Ingolstadt (DE)

( * ) Notice: Subject to any disclaimer, the term of this patent is extended or adjusted under 35 U.S.C. 154(b) by 125 days.

(21) Appl. No.: 12/797,669

(22) Filed: Jun. 10, 2010

(65) Prior Publication Data

US 2011/0056269 A1 Mar. 10, 2011

(30) Foreign Application Priority Data

Sep. 4, 2009 (DE) .................... 10 2009 039 929

(51) Int. Cl.
*G01M 15/10* (2006.01)
(52) U.S. Cl. .................... 73/114.75; 73/114.69
(58) Field of Classification Search ............. 73/114.69, 73/114.72, 114.73, 114.75
See application file for complete search history.

(56) References Cited

U.S. PATENT DOCUMENTS

| | | | | |
|---|---|---|---|---|
| 5,335,538 A * | 8/1994 | Blischke et al. | ........... | 73/114.75 |
| 7,444,235 B2 * | 10/2008 | Anilovich et al. | ............ | 701/114 |
| 7,874,204 B2 * | 1/2011 | Odendall | .................... | 73/114.72 |
| 7,926,333 B2 * | 4/2011 | Odendall | .................... | 73/114.75 |
| 8,020,371 B2 * | 9/2011 | Sawada | .......................... | 60/285 |
| 2002/0157379 A1 | 10/2002 | Kakuyama et al. | | |
| 2010/0146936 A1 * | 6/2010 | Sawada | ............................ | 60/277 |
| 2011/0077908 A1 * | 3/2011 | Odendall | ....................... | 702/183 |

FOREIGN PATENT DOCUMENTS

DE 11 2007 001 343 T5 4/2009

* cited by examiner

*Primary Examiner* — Freddie Kirkland, III
(74) *Attorney, Agent, or Firm* — Novak Druce + Quigg LLP

(57) ABSTRACT

During the measurement of the oxygen storage capacity of an oxygen storage system, which is assigned to a catalytic converter, a switchover operation from lean to rich exhaust gas or vice versa is effected. The measurement signals of a lambda probe are recorded; and an integral calculation is carried out over a time interval on the basis of the measurement values. Whereas in the past the start of the time interval was the point in time of the switchover operation, the present invention provides that the start of the second time interval is determined on the basis of the measurement signals of the second lambda probe i.e., the point in time is preferably fixed at the time at which these measurement values reach an extreme value. This design allows the oxygen storage capacity to be measured even if the lambda probe is not fully functioning totally correctly.

3 Claims, 4 Drawing Sheets

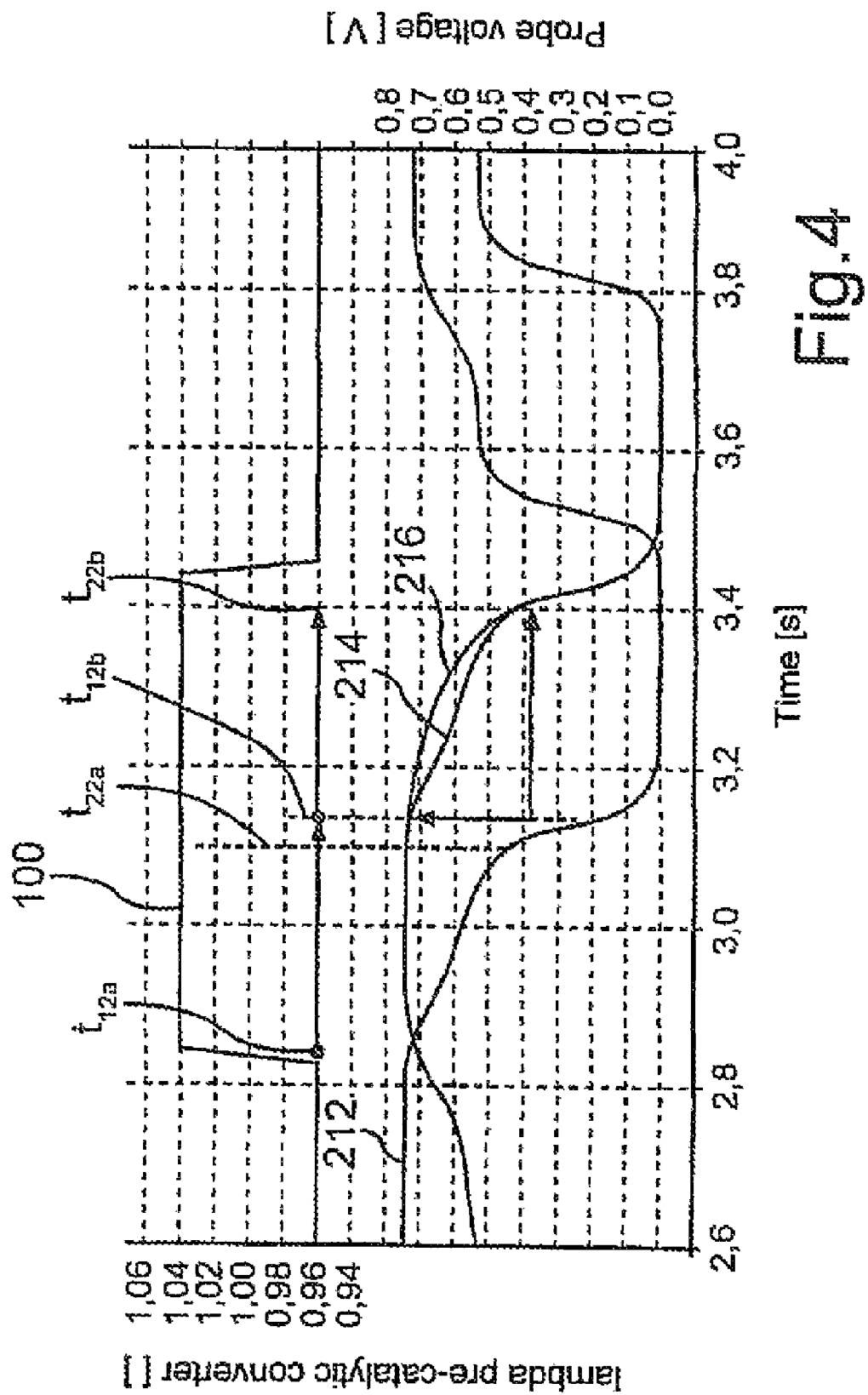

METHOD FOR DETERMINING THE OXYGEN STORAGE CAPACITY

The invention relates to a method for determining the oxygen storage capacity of at least one region of an oxygen storage system that is assigned to a catalytic converter in an exhaust gas system of an internal combustion engine. The engineering object of the oxygen storage system is to absorb oxygen for the reduction of nitrogen oxides and to release oxygen in order to burn carbon monoxide to carbon dioxide. The oxygen storage system is typically integrated directly into the catalytic converter.

BACKGROUND OF THE INVENTION

Upstream of such a catalytic converter and, thus, upstream of the oxygen storage system (when viewed in the outflow direction of the exhaust gas) conventionally there is a first lambda probe—the so-called pre-catalytic converter probe. Downstream of the catalytic converter (or rather a region thereof) there is a second lambda probe—the post-catalytic converter probe. In order to determine the oxygen storage capacity, a switchover operation from lean to rich exhaust gas and/or vice versa is effected. In the course of determining the exhaust gas composition, the measurement results of the first lambda probe are used. In contrast, the measurement results of the second lambda probe show the buffering by means of the oxygen storage system. To date, the point in time of the switchover operation of the exhaust gas composition was found by means of the first lambda probe; and then a numerical integration over a time interval beginning with this point in time was calculated. The time interval terminates when the second lambda probe shows a breakthrough (by means of a certain voltage value of, for example, 0.45 V).

The formula that is used during the switchover operation from rich to lean exhaust gas for the oxygen storage capacity OSC in g reads:

$$OSC = 0{,}23 \int_{t_1}^{t_2} (\lambda - 1)\dot{m}(t)dt \quad (1)$$

During the switchover operation from lean to rich, the following formula holds true for the oxygen release storage capacity:

$$RSC = 0{,}23 \int_{t_3}^{t_4} (1 - \lambda)\dot{m}(t)dt$$

In this respect $\dot{m}(t)$ is the exhaust gas mass flow through the oxygen storage system in g/s. The variable $\lambda$ is derived from the measurement signals of the first lambda probe, thus, $\lambda(t)$.

In this context $t_1$ or $t_3$ is the point in time of the lambda switchover; $t_2$ is the time, at which the value U(t) is equal to 0.45 V; at $t_4$, U(t) is equal to 0.70 V.

The lambda probes, which are configured typically as Nernst sensors, can be subject to aging. Aging has the effect as if the signals of a correctly functioning lambda probe were filtered. The filtering can occur due to the adverse effect in the flow of a fluid in the lambda probe or in the electrical signal conditioning. In addition or as an alternative, there is a time shift.

The past methods for determining the oxygen storage capacity do not work reliably if an aged lambda probe is used. The aged lambda probe causes a larger oxygen storage capacity to be measured than is actually the case. As a result, it can happen that there is simultaneously an aged second lambda probe and an aged oxygen storage system/aged catalytic converter, but this situation cannot be detected. Then the result will be a high emission of toxic substances that is undesired.

The engineering object of the invention is to provide an improved method for determining the oxygen storage capacity for an oxygen storage system (or rather a region thereof).

SUMMARY OF THE INVENTION

According to the invention, the start of the predetermined time interval for the integral calculation is determined on the basis of measurement signals of the second lambda probe.

Whereas in the past the time of the switchover operation, which was either actively generated or measured by the first lambda probe, initiated the predetermined time interval, now the measurement signals of the second lambda probe itself are used. The result is that the time delay, which has an impact on the time at which the integration interval terminates, owing to the slowed down probe, has the same effect on the start of said integration interval; and, thus, the integration duration is independent of a possible slowdown of the second lambda probe.

The inventor of the present application recognizes that the switch between lean and rich exhaust gas can affect the measurement signals of the second lambda probe in such a specific way that the start of the predetermined time interval can be defined.

Working on the above basis, the start of the time interval can be defined by the point in time at which the measurement values of the second lambda probe reach an extreme value (at least locally). Even if the effects of filtering the signals of a fully functional lambda probe and a time shift occur, it is possible to calculate the actual oxygen storage capacity with a sufficiently good degree of precision, if at the same time the numerical integration calculation for balancing purposes starts at an extreme value, because the end of the time interval is also shifted in the same way as its beginning.

An extreme value can be easily determined by changing the sign in the time derivation of the measurement signals of the probe.

As is otherwise customary, the time interval preferably terminates with the measurement signals of the second lambda probe passing through a predetermined voltage value. This value can be different from the voltage value that is used in conventional methods. It can be suitably selected.

The aforementioned formulas for the oxygen storage capacity can be used.

DETAILED DESCRIPTION OF THE PREFERRED EMBODIMENT OF THE INVENTION

Figure 1:
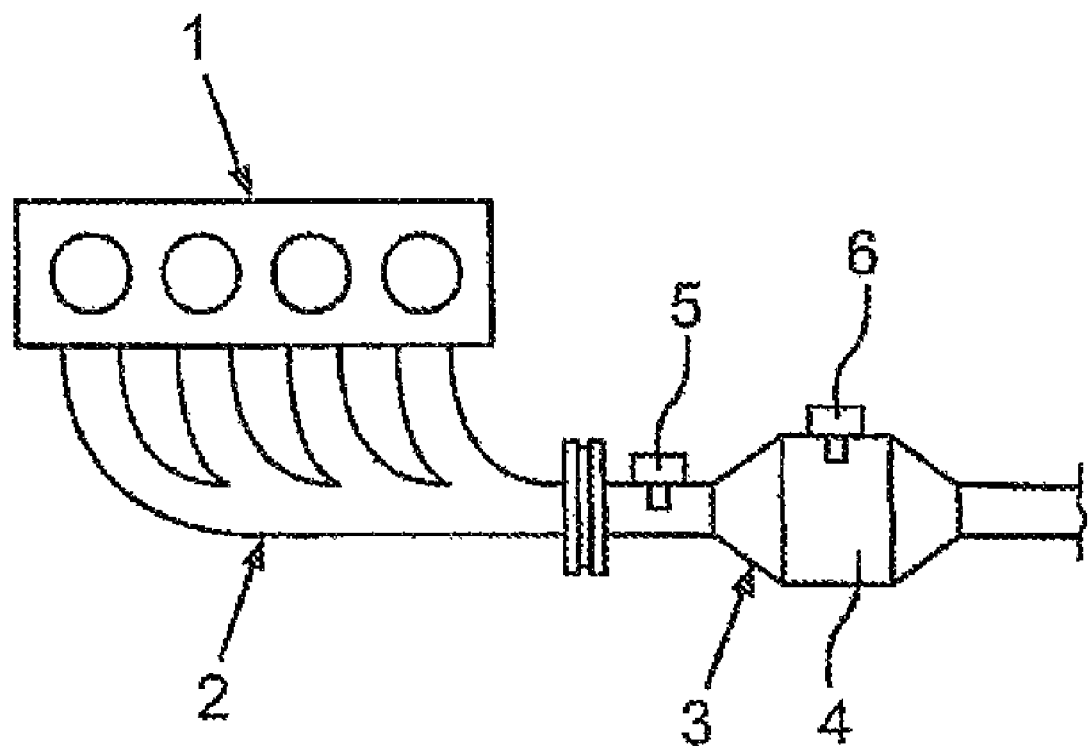
FIG. 1 shows an arrangement in which a single method according to the invention is practical; by means of FIG. 2 illustrates the influence of the diffusing hydrogen gas on the measurement signals of a post-catalytic converter lambda probe; by means of FIG. 3 illustrates the influence of a second type of filtering on the measurement signals of a post-catalytic converter lambda probe; by means of FIG. 4 illustrates the influence of filtering and time delay on the measurement signals of a post-catalytic converter lambda probe.

FIG. 1 shows a schematic drawing of an internal combustion engine 1 with an exhaust gas system 2. The exhaust gas system 2 comprises an exhaust gas catalytic converter 3, which is designed, for example, as a three way catalytic converter, an $NO_x$ storage-type catalytic converter, an SCR catalytic converter, or an active particulate filter, as well as comprises an integrated oxygen storage system 4. Furthermore, the exhaust gas system 2 comprises a first lambda probe 5, which is mounted upstream of the catalytic converter 3 and which serves as the guiding probe, as well as a second lambda probe 6, which is assigned to the exhaust gas catalytic converter 3 and which serves as the control probe.

In the present embodiment, the second lambda probe 6 is mounted downstream of the exhaust gas catalytic converter 3. However, this lambda probe could also be arranged just as well directly inside the exhaust gas catalytic converter 3, that is, positioned downstream of a partial volume of the oxygen storage system 4.

It is assumed below that the exhaust gas of the internal combustion engine 1 can be set to a specified air-to-fuel ratio $\lambda$ with at least a predetermined degree of accuracy.

The engineering object is to determine the oxygen storage capacity OSC of the oxygen storage system 4, even if by chance the second lambda probe 6 does not function ideally.

A switchover between lean and rich exhaust gas is effected in an alternating manner. The curve of the air-to-fuel ratio $\lambda$ ahead of the catalytic converter 3 is shown at the top in FIG. 2 and designated with the reference numeral 10.

Figure 2:
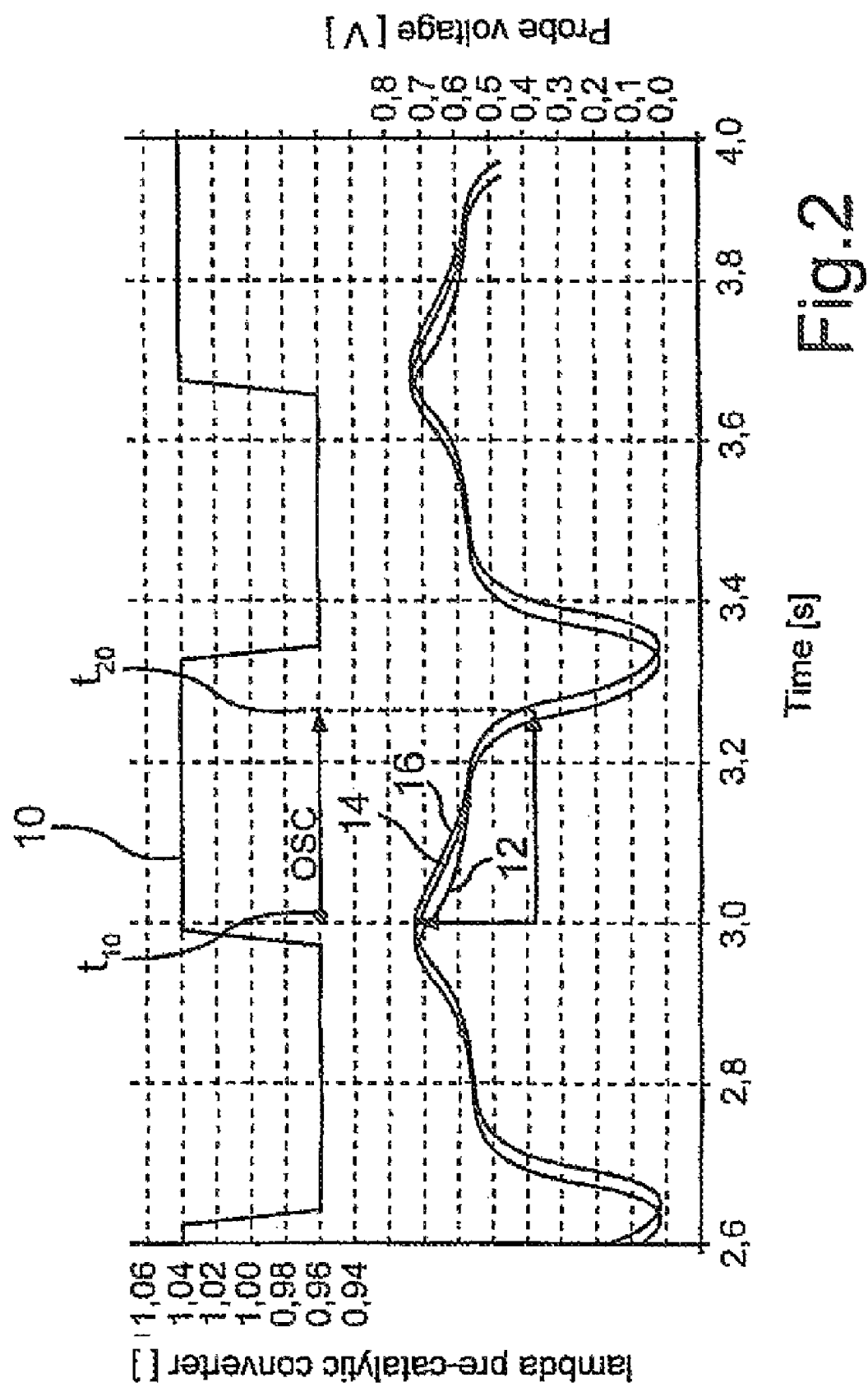

Then the curve 12 in the lower portion of FIG. 2 shows the probe voltage, that is, the measurement values of the second lambda probe 6, when the second lambda probe is working ideally, that is, if there is no filtering effect due to aging phenomena and also no time delay. The curve 14 shows the behavior of the second lambda probe 6 when there is minimal filtering due to hydraulic effects, as is the case with a good probe. In addition, FIG. 2 shows the effects owing to the production of hydrogen gas in the catalytic converter 3.

In order to measure the oxygen storage capacity OSC of the oxygen storage system 4, the starting point is typically the point in time $t_{10}$ of the switchover operation; and the measurement ends when the measurement values of the curve reach the value 0.45 V, that is, at time $t_{20}$. The present diagram under discussion shows the time $t_{20}$ for the curve 14.

Then the oxygen storage capacity OSC is calculated according to the following formula:

$$OSC = 0.23 \int_{t_1}^{t_2} (\lambda - 1) \dot{m}(t) dt \quad (1)$$

where the variable $\lambda$ in the formula is derived from the probe voltage of the first lambda probe or is also derived from a lambda model; and where $\dot{m}(t)$ is the exhaust gas mass flow in grams per second.

FIG. 3 shows once again the curve 10 and, in addition, the curve 112 of the probe signal of the second lambda probe, when the starting signals are not subjected to a filter; and the curve 114, when the filtering of the probe signal is subjected to hydraulic effects or owing to an electrical low pass filter; and the curve 116 according to curve 114, wherein the hydrogen cross-sensitivity is also considered. Filtering has the effect that the signals of the second lambda probe show the actual measurement values only after a delay. Hence, the results are measurement errors in the course of calculating the oxygen capacity. In the conventional measurement method, one would integrate over the integral ranging from $t_{11a}$ to $t_{21b}$. However, it is advisable to start, instead, with the integration no sooner than at the point in time $t_{11b}$. By integrating over the integral ranging from $t_{11a}$ to $t_{11b}$, the measurement of the oxygen capacity is shifted erroneously upwards. The result of this correction is that the actual integration time ranging from $t_{11b}$ to $t_{21b}$ corresponds to the ideal integration time ranging from $t_{11a}$ to $t_{21a}$, thus eliminating the effect of the faulty probe.

FIG. 4 shows once more the curve 100 as well as a curve 212 of the probe signal of the second lambda probe without filtering; and the curve 214 of the probe signal based on a time shift; and 216 the curve of the probe signal according to the curve 214 with delay, wherein the hydrogen cross-sensitivity is also considered. In the conventional measurement method one would measure at the start ranging from $t_{12a}$ as far as to the point in time $t_{22b}$, taking into consideration the hydrogen gas sensitivity. The time shift has an especially profound effect on the invalid measurement. It would be advisable not to start the integration, according to the above formula, until at the point in time $t_{12b}$. The integration over the interval between $t_{12a}$ and $t_{12b}$ provides for a measurement error. Even in this case the result of this correction is that the actual integration time ranging from $t_{12b}$ to $t_{22b}$ corresponds to the ideal integration time ranging from $t_{12a}$ to $t_{22a}$, thus eliminating the effect of the time delay.

Figure 3:
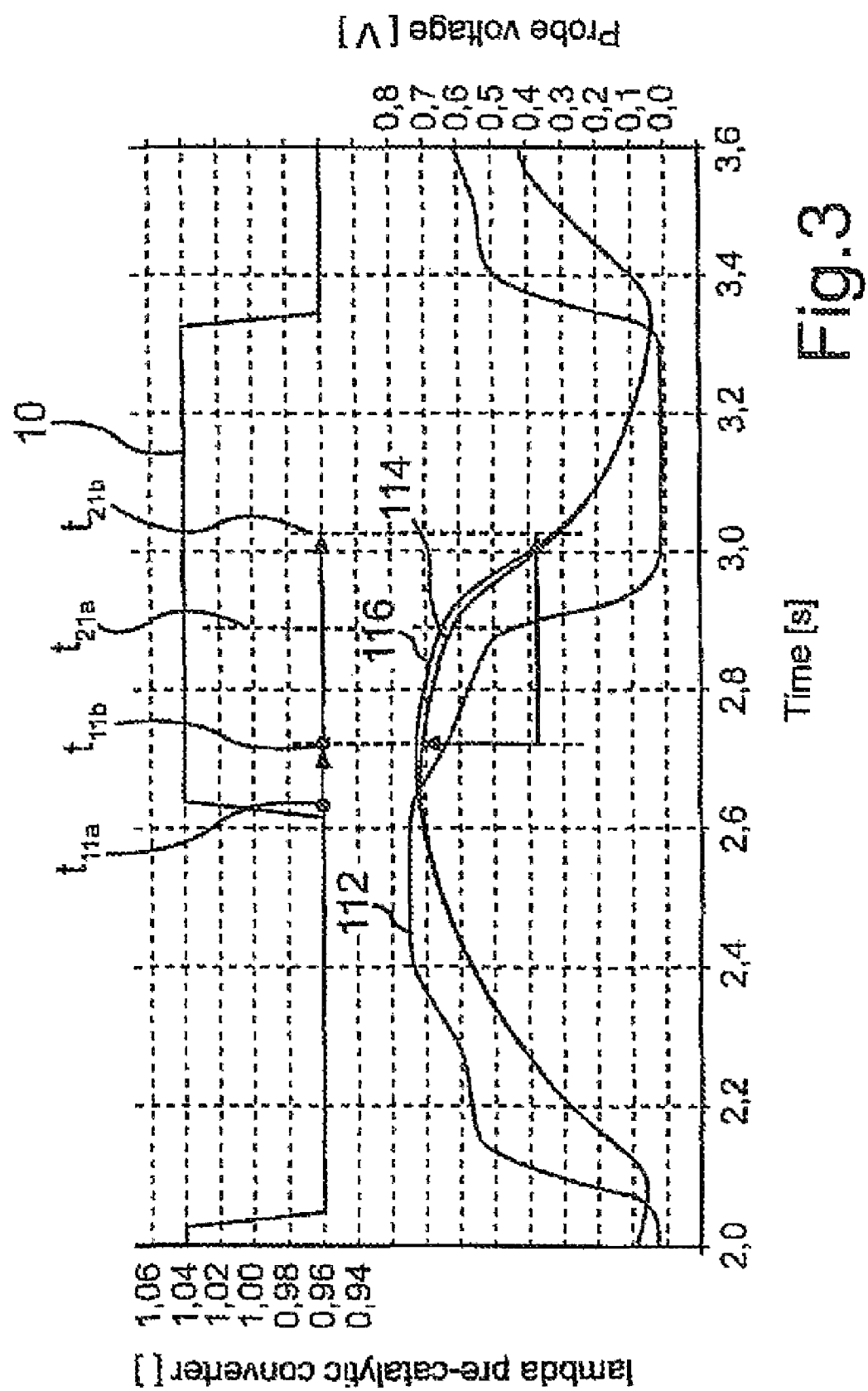

It has been demonstrated that it is advisable to analyze the curve of the second lambda probe after the local maxima. In FIG. 3 the point in time $t_{11b}$ corresponds to a local maximum value in the curve 116. Then the oxygen storage capacity between the point in time $t_{11b}$ and the point in time $t_{21b}$ of the probe voltage of 0.45 V can be measured. Similarly in FIG. 4 the point in time $t_{12b}$ corresponds to a maximum value in the curve 216; and the point in time $t_{22b}$ corresponds to the passage through the probe voltage of 0.45 V.

Therefore, on the basis of the curve of the second lambda probe it is easy to identify the point in time at which the measurement of the oxygen storage capacity should be started.

Therefore, in the present invention the signals of the second lambda oxygen probe are continuously analyzed. Although the oxygen storage capacity is measured basically by means of a switchover operation in the exhaust gas composition, the integration, according to the above formula, does not start until at a point in time that corresponds to an extreme value in the curve of the measurement values. That is, it starts with a change in the sign in the derivation over time.

The value of the probe voltage that defines the end of the respective interval can be different from 0.45 V and can be set to the respective type of lambda probe on the basis of empirical values and/or measurements in such a way that the duration of the time interval is as identical as possible in different aging states of the lambda probe.

In the present embodiment the measurement of the oxygen storage capacity OSC was described in conjunction with a switchover operation from rich to lean. When changing the sign in the formula (1) the same is also valid for the oxygen release storage capacity RSC, where the minima determine the integration limit.

The invention claimed is:

1. A method for determining the oxygen storage capacity of at least one region of an oxygen storage system that is assigned to a catalytic converter in an exhaust gas system of an internal combustion engine, and wherein in the outflow direction of the exhaust gas a first lambda probe is arranged ahead of the at least one region, and after the at least one region there is a second lambda probe, wherein in order to determine, a switchover operation from lean to rich exhaust gas and/or vice versa is effected; and the measurement signals of the first lambda probe are recorded over a time interval and made the basis of an integral calculation, wherein the start of a predetermined time interval is determined on the basis of the measurement signals of the second lambda probe, the start of the point in time is determined as the point in time at which the measurement values of the second lambda probe reach and the extreme value is determined by means of a sign change in the time derivation of the measurement signals of the second lambda probe.

2. The method, according claim 1, wherein the time interval ends with the passage through a predetermined voltage value by the measurement signals of the second lambda probe.

3. A method for determining the oxygen storage capacity of at least one region of an oxygen storage system that is assigned to a catalytic converter in an exhaust gas system of an internal combustion engine, and wherein in the outflow direction of the exhaust gas a first lambda probe is arranged ahead of the at least one region, and after the at least one region there is a second lambda probe, wherein in order to determine, a switchover operation from lean to rich exhaust gas and/or vice versa is effected; and the measurement signals of the first lambda probe are recorded over a time interval and made the basis of an integral calculation, wherein the start of a predetermined time interval is determined on the basis of the measurement signals of the second lambda probe and at least one of the integral $$OSC = +0{,}23 \int_{t_1}^{t_2} (\lambda - 1) \dot{m}(t) dt$$

is calculated as the oxygen storage capacity (OSC); and the integral $$RSC = -0{,}23 \int_{t_1}^{t_2} (1 - \lambda) \dot{m}(t) dt$$

is calculated as the oxygen release storage capacity, where $\lambda(t)$ is derived from the measurement signal of the second lambda probe; $\dot{m}$ is the exhaust:gas mass flow in g/s; and $t_1$ and $t_2$ are the limits of the time interval.

* * * * *

UNITED STATES PATENT AND TRADEMARK OFFICE
CERTIFICATE OF CORRECTION

PATENT NO. : 8,225,649 B2
APPLICATION NO. : 12/797669
DATED : July 24, 2012
INVENTOR(S) : Odendall et al.

It is certified that error appears in the above-identified patent and that said Letters Patent is hereby corrected as shown below:

Claim 3: Column 6, line 14: Should state the following equation:

$$RSC = -0{,}23 \int_{t_1}^{t_2} (\lambda - 1)\, \dot{m}(t)\, dt$$

The issued patent equation should be deleted.

Signed and Sealed this
Eighteenth Day of September, 2012

David J. Kappos
*Director of the United States Patent and Trademark Office*